April 25, 1967 C. A. BEAVER ETAL 3,315,616
MOTOR ACTUATED DROP-BOTTOM HOPPER CAR DOORS
Filed Feb. 24, 1964 4 Sheets-Sheet 1
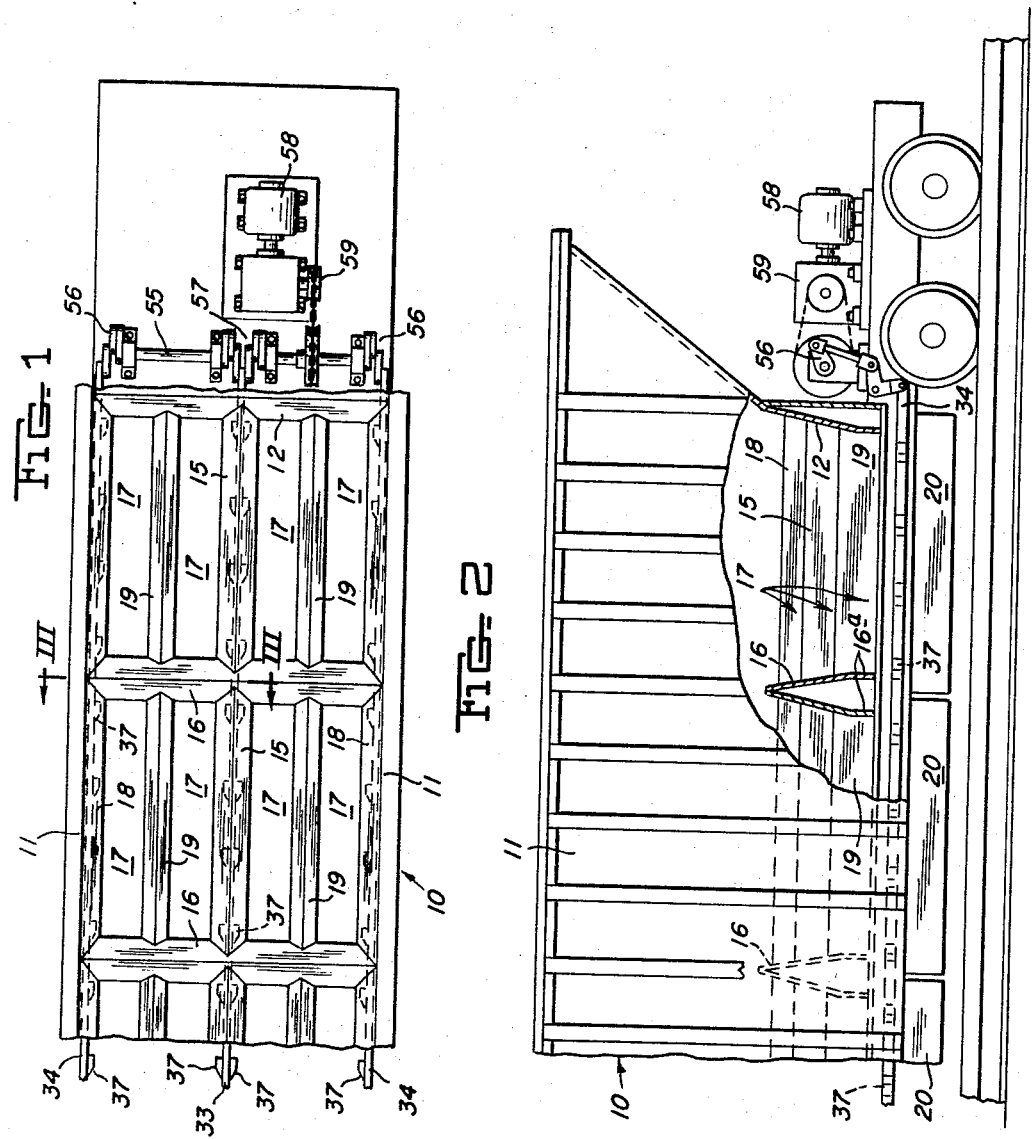
INVENTORS
CHARLES A. BEAVER and
RODNEY E. MURDOCK
By J. Wallace Hopkins
Attorney

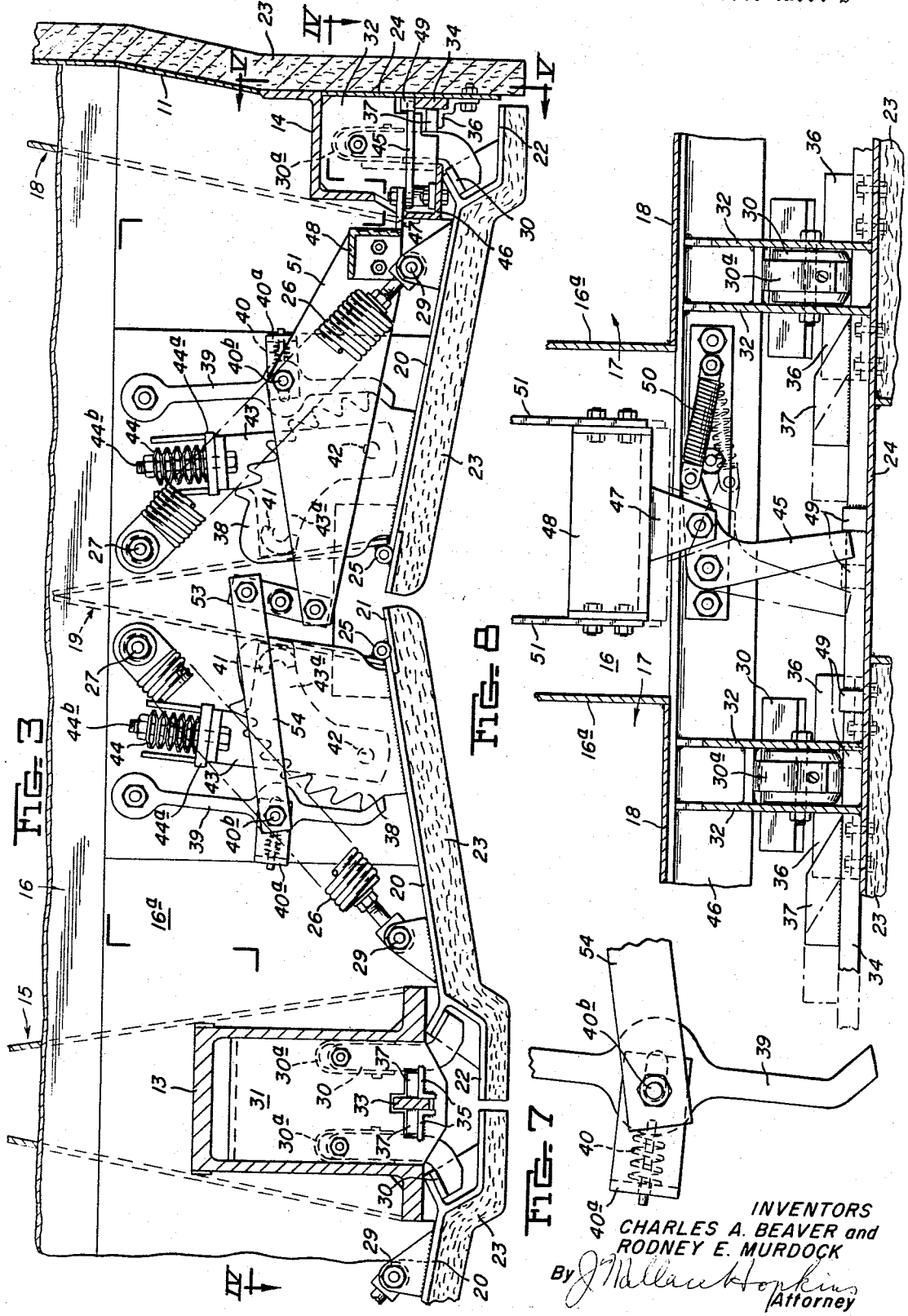

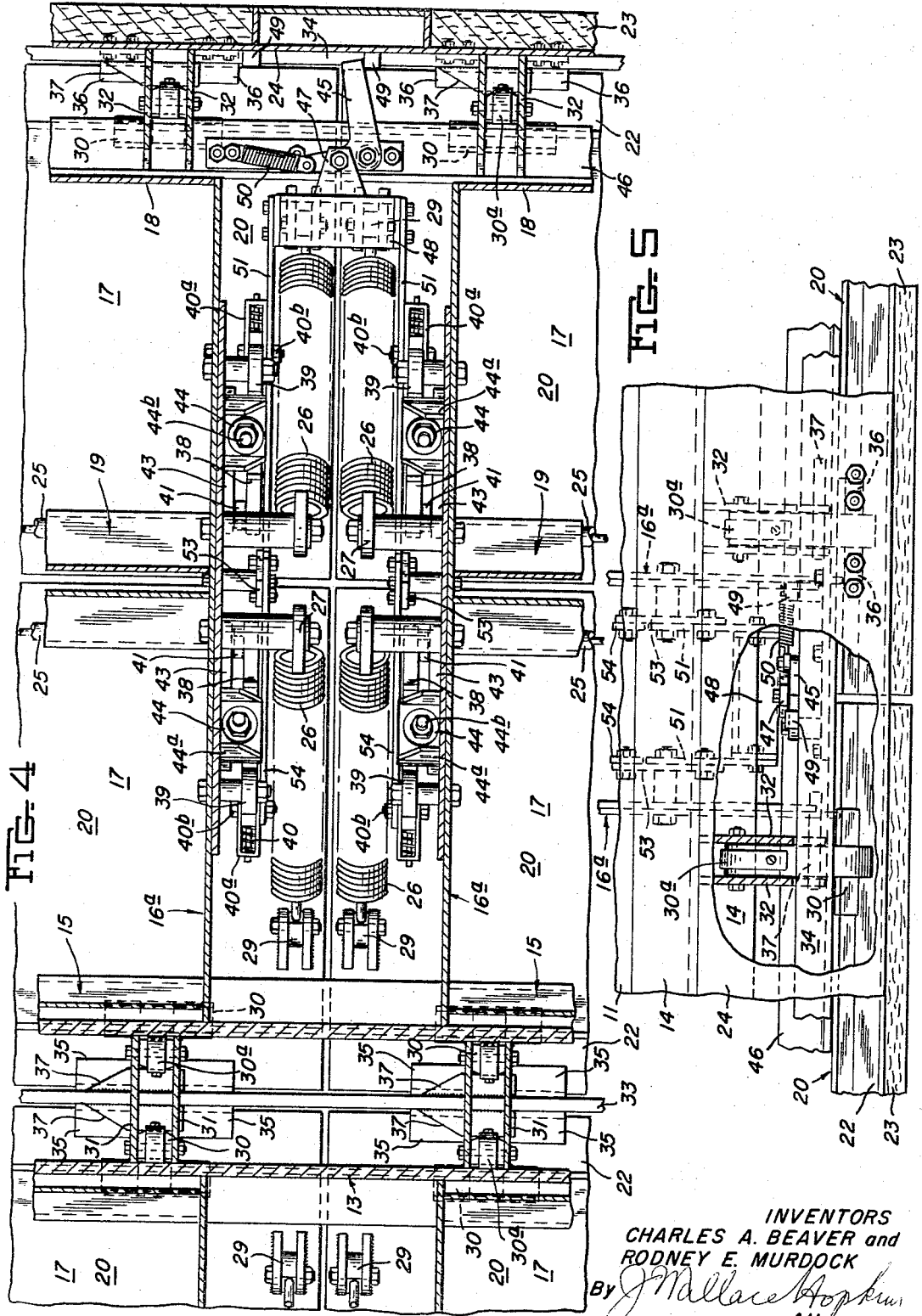

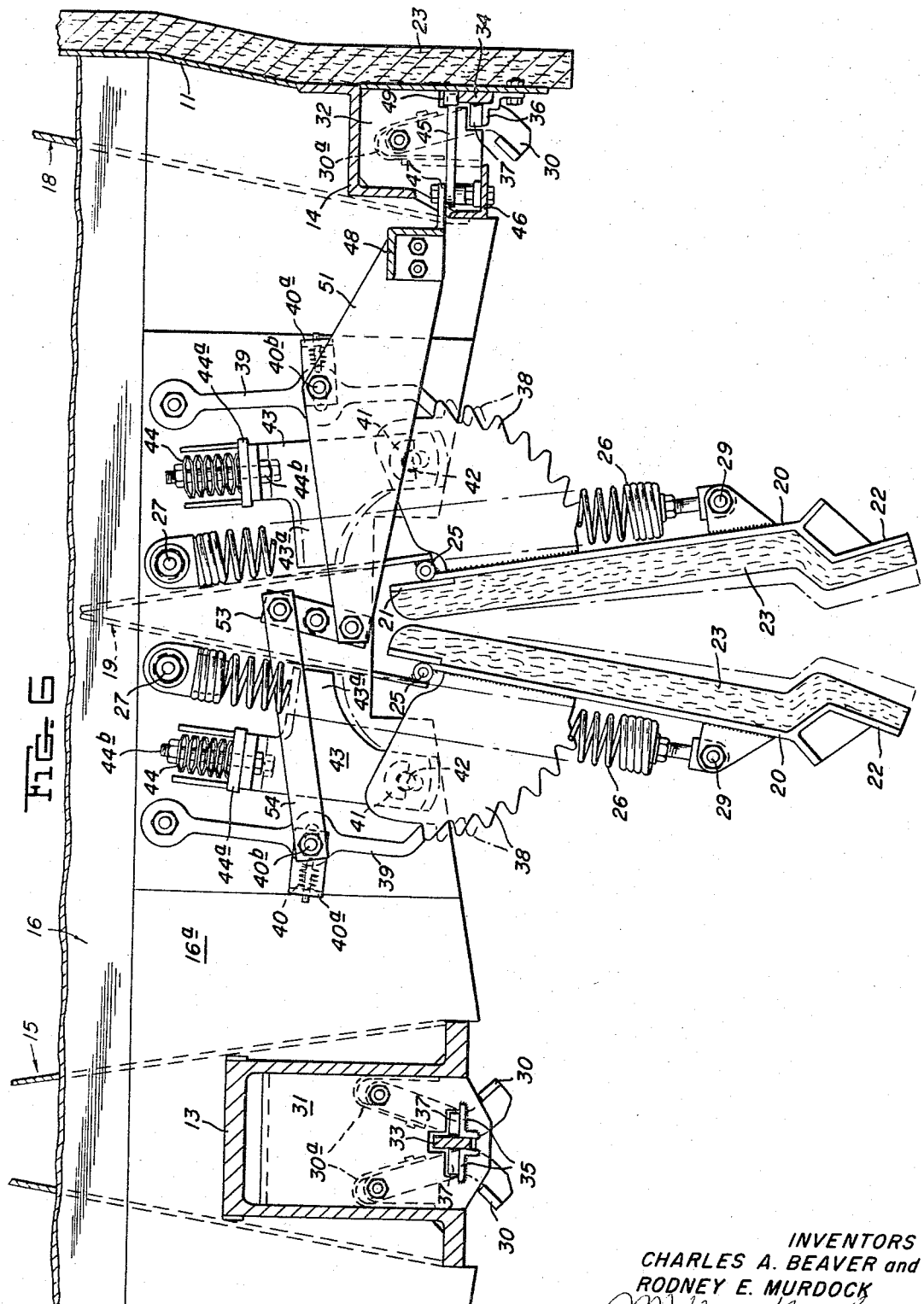

United States Patent Office 3,315,616
Patented Apr. 25, 1967

3,315,616
MOTOR ACTUATED DROP-BOTTOM
HOPPER CAR DOORS
Charles A. Beaver, Greenville Township, Mercer County, and Rodney E. Murdock, Hempfield Township, Mercer County, Pa., assignors to Bessemer and Lake Erie Railroad Company, a corporation of Pennsylvania
Filed Feb. 24, 1964, Ser. No. 346,655
8 Claims. (Cl. 105—248)

This invention relates to a railway car and, in particular, to a hopper car adapted for the transport of bulk material such as coal, ore and the like.

Drop-bottom railroad hopper cars are used extensively although the conventional design has certain disadvantages. One of these is the difficulty experienced in unloading material, particularly when frozen, because of the small angle of the doors when open and the limited size of the opening. Another is the considerable labor required to open and reclose the doors. It is accordingly the object of our invention to provide a car structure which can easily be thermally insulated and is thus adapted for use of heating facilities to prevent freezing and, further, to provide unloading doors affording a large outlet when open under the weight of the load, having means for locking them in open position and spring reclosing means operative when the doors are unlocked after the load has been discharged.

In a preferred embodiment, we mount longitudinal and transverse sheds in the car body, dividing the lower portion thereof into cells or compartments. A pair of doors pivoted on their adjacent sides from the bottom of each cell. Pivoted latches normally hold the doors in closed position. Reclosing tension springs adjacent the ends of the doors are stressed as the doors open. Compression springs buffer the doors in the wide-open position. Ratchet-and-pawl locking means hold the doors open. Control bars slidable longitudinally of the car actuate the latches and the pawls to effect the proper sequence of operations. When the pawls of the locking means are retracted, the springs reclose the doors.

A complete understanding of the invention may be obtained from the following detailed description and explanation which refer to the accompanying drawings illustrating the present preferred embodiment. In the drawings:

FIGURE 1 is a partial plan view of a car embodying our invention;

FIGURE 2 is an elevation, partly broken away, showing the doors open;

FIGURE 3 is a partial transverse section taken along the plane of line III—III of FIGURE 1;

FIGURE 4 is a partial plan view of the parts seen in a horizontal section of FIGURE 3, taken along the plane of line IV—IV;

FIGURE 5 is a partial side elevation taken on line V—V of FIGURE 3, with parts broken away;

FIGURE 6 is a view similar to FIGURE 3 showing the doors and parts in two alternate positions;

FIGURE 7 is an enlarged detail of a pawl; and

FIGURE 8 is an enlarged detail of the bell-crank release.

Referring now in detail to the drawings, a car body 10 having sides 11 and sloping end walls 12 is carried on a frame including a center sill 13 and side sills 14. The frame is of conventional character and is therefore shown only in general. It is carried on standard wheeled trucks, one at each end. The body has a central longitudinal shed 15 and spaced transverse sheds 16 dividing the bottom into cells or compartments 17, the sides of which are formed by slope sheets 18. Sheds 16 stand on spaced partition plates 16a. A secondary shed 19 extends longitudinally of each cell, with its ends bearing on a transverse shed 16 or a sloping end wall 12.

Symmetrically arranged doors 20 close the space at the bottom of each cell 17. As shown in FIGURE 3, the doors are in the form of flat plates extending from the edges of shed 19 to one of the sills 13, 14. Longitudinally, the doors extend from one shed 16 to the next or to an end wall 12. Each door has inner and outer margin plates 21 and 22 attached thereto. A lagging 23 of thermal insulation extends over the doors and margin plates. Similar lagging overlies end walls 12 and sides 11 of the body and curtain plates 24 depending from the latter. Piano-type hinges 25 pivot the adjacent sides of doors 20 to the lower edges of shed 19.

Closing torque is exerted on each door by tension coil springs 26, one at each end thereof. The upper ends of the springs are pivoted at 27 on studs extending normally from partition plates 16a. The lower ends of the springs are pivoted at 29 to the ends of the doors adjacent their outer edges. These edges are bent upwardly at a slight angle for engagement by depending latches 30 pivoted between spaced pairs of transverse diaphragm plates 31 and 32 welded to sills 13 and 14, respectively. Latches 30 have curved leaf springs 30a thereon urging them away from the edges of doors 20. As shown in FIGURE 4, there is a latch adjacent each end of each door.

Latches 30 are actuated toward the positions they occupy in FIGURE 3 by slide bars 33 and 34 movable longitudinally through holes and notches formed in plates 31 and 32, respectively. The bars are slidable on angle brackets 35 and 36 secured to plates 31 and 32, respectively, and have wedges 37 spaced therealong which normally hold the latches in door-engaging position. When the bars are moved axially, however, so that the wedges clear the latches, the latter are free to swing away from doors 20, aided by the weight of the lading on the doors, releasing them for downtilting. As the doors turn on their hinges 25, springs 26 are progressively stressed.

At each end of each door 20, a sector ratchet 38 is mounted, concentric with hinge 25. Pawls 39 pivoted to plates 16a cooperate with the ratchets. As shown in FIGURE 7, each pawl has a compression spring 40 in a yoke 40a tending to set it. Springs 40 are compressed between the yokes and pawl 39. Pins 40b extend through slots in the pawls and holes in the yoke permit the pawls to ride over the teeth of the ratchets as the latter turn. A bearing socket 41 on each ratchet is adapted, as the door nears the fully open position, to engage a stud 42 projecting horizontally from a buffer slide plate 43. This plate is suspended from a compression spring 44 mounted on a bracket 44a carried by plate 16a. Plate 43 has a lateral extension 43a serving to guide travel of socket 41. A bolt 44b extending through spring 44 suspends plate 43. Springs 44 thus buffer the fall of the doors as they approach the limit of their opening.

After the doors have been fully opened under the weight of the load and locked in open position by ratchets 38 and pawls 39, the pawls must be retracted to permit the doors to reclose. This is effected by bell cranks 45 pivoted in a horizontal plane to an angle 46 welded to the diaphragm plates 32 in side sill 14 and parallel thereto. The tongue 47 of a bracket 48, pivotally connected to bell crank 45, extends laterally over angle 46. The bell cranks are actuated from one position to another by striker blocks 49 spaced along slide bar 34. A toggle link 50 with a compression spring thereon holds bell crank 45 in one of its two extreme positions, as shown in FIGURE 8.

When the bell cranks are turned clockwise from the position shown in FIGURE 4, they pull brackets 48 outwardly thus effecting similar movement of links 51 which are pivoted to the outer pawls 39 at 40b. Opposite movement is imparted to the inner pawls 39 by reversing links 53 pivotally mounted on plates 16a and pivoted to plates 51 and connecting links 54. The yokes of spring 40 of the inner pawls are mounted on the pawls. When the locking engagement of the pawls 39 with the ratchets 38 is thus broken, springs 26 immediately reclose the doors. Thereafter, latches 30 are brought into engagement with the bent-up edges of the doors by longitudinal movement of bars 33 and 34, through the medium of wedges 37. This movement also restores bell cranks 45 to the position shown.

Slide bars 33 and 34 are reciprocated by a transverse shaft 55 journaled at the end of the car, through cranks 56 and cranks and pitman 57. Shaft 55 is turned by an electric motor 58 through a gear reducer and a chain-and-sprocket drive 59.

The operation will probably be clear from the foregoing but will be briefly summarized. It will be assumed that, initially, the doors 20 are closed and the latches 30 are in engagement therewith, being held in effective position by wedges 37 on slide bars 33 and 34. In order to discharge the contents of body 10, motor 58 is operated by connecting it to any convenient source of electric current, until bars 33 and 34 have been shifted longitudinally so that wedges 37 move away from latches 30. Motor 58 is then stopped. The weight of the load on the doors thereupon causes them to turn on their hinges 25, against the restoring force exerted by springs 26. As the doors turn down, pawls 39 ride over the teeth of ratchets 38, and are effective to lock the doors open. As the doors approach the fully open position, sockets 41 engage studs 42 and compress the buffer springs 44, as shown in chain lines in FIGURE 6.

When the car lading has been discharged, reclosing of doors 20 may be effected by again operating motor 58 to shift bars 33 and 34 further in the same direction to cause blocks 49 to trip bell cranks 45. This causes plates 51 and links 54 to withdraw pawls 39 from ratchets 38 whereupon springs 26 reclose the doors. When the doors have been closed, continued operation of motor 58 reverses the movement of bars 33 and 34 until wedges 37 actuate latches 30 into engagement with the doors and blocks 49 restore the bell cranks 45 to the illustrated position. This completes a cycle of opening and reclosing the doors after rotation of crank shaft 55 through 180°.

It will be evident that our car structure has numerous advantages. In the first place, all operating mechanism is above the doors leaving the car bottom clear and unobstructed so that the insulating lagging may be easily applied to cover the entire exterior. The mechanism, furthermore, is fully protected from the weather and the lading by sheds 16. Secondly, the doors are released by power means for positive opening under the weight of the load and are locked open by the ratchets and pawls until the lading has been fully discharged, thus avoiding throttling in the later stages of discharge. The doors may then be unlocked by the same power means for self reclosing. When closed, the doors are positively latched to prevent opening until desired.

Opening movement of the doors is buffered but, on reclosing, the doors slam against the frame sills and are then firmly held in the closed position by the power-actuated latches. The slide bars which set the latches cannot be displaced by shock or vibration. The moment arm through which the reclosing springs act decreases as the doors open and the spring stress increases and, conversely, the moment arm increases as the doors close and the spring tension decreases. While the doors are open, the door latches are held out of the way by springs 30a to avoid interference with reclosing. The buffer springs 44 gradually arrest the opening movement of the doors and prevent damage thereto or to their insulation as they drop to vertical position.

Although we have disclosed herein the preferred embodiment of our invention, we intend to cover as well any change or modification therein which may be made without departing from the spirit and scope of the invention.

We claim:

1. The combination with a car body including sides and ends and a supporting frame therefor including spaced center and side sills, of longitudinal and transverse sheds dividing the car bottom into compartments, a secondary shed located centrally of each compartment and extending parallel to said sills, a pair of doors disposed side-by-side in the bottom of each compartment, hinge means at the lower edges of the secondary sheds pivotally mounting the doors on their adjacent edges and pivoted latches depending from said sills, respectively, adapted to engage the edges of said doors opposite said adjacent edges.

2. The combination defined in claim 1, characterized by bars slidable along said sills having wedges thereon effective to actuate said latches.

3. The combination defined in claim 1, characterized by tension springs pivotally connected to said doors and to the transverse sheds so as to be stressed on opening of said doors.

4. The combination defined in claim 1, characterized by a sector ratchet upstanding on each of said doors and pawls pivoted to the transverse sheds adapted to cooperate with said ratchets.

5. The combination defined in claim 4, characterized by buffer means mounted on said transverse sheds effective to arrest downtilting of said doors and bearing means on said ratchets adapted to engage said buffer means.

6. The combination defined in claim 1, characterized by pawl-retracting links extending normal to the hinge axis of said doors.

7. The combination defined in claim 6, characterized by a bar slidable along one of said sills and pivoted members actuated between two extreme positions by said bar, adapted to effect movement of said links.

8. The combination defined in claim 7, characterized by toggle springs pivoted to said pivoted members adapted to bias them toward either extreme position.

References Cited by the Examiner

UNITED STATES PATENTS

| | | | |
|---|---|---|---|
| 676,104 | 6/1901 | Souder | 105—251 X |
| 1,000,753 | 8/1911 | Olden | 105—240 |
| 1,035,389 | 8/1912 | Seaberg | 105—245 |
| 1,284,111 | 11/1918 | Kestler | 105—300 X |
| 1,375,700 | 4/1921 | Ingoldsby | 105—310 |
| 3,188,980 | 6/1965 | Tearpock et al. | 105—245 X |
| 3,192,876 | 7/1965 | Ortner | 105—284 |

FOREIGN PATENTS

| | | |
|---|---|---|
| 244,365 | 3/1912 | Germany. |
| 380,645 | 9/1923 | Germany. |

ARTHUR L. LA POINT, *Primary Examiner.*

H. BELTRAN, *Assistant Examiner.*